(12) United States Patent
Chen et al.

(10) Patent No.: US 8,186,867 B2
(45) Date of Patent: May 29, 2012

(54) LIGHT GUIDE PLATE AND SIDE-EMITTING BACKLIGHT MODULE HAVING THE SAME

(75) Inventors: Chien-Hsiang Chen, Hsinchu (TW); Ming-Dah Liu, Hsinchu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 562 days.

(21) Appl. No.: 12/213,315

(22) Filed: Jun. 18, 2008

(65) Prior Publication Data

US 2009/0109703 A1 Apr. 30, 2009

(30) Foreign Application Priority Data

Oct. 31, 2007 (TW) .............................. 96218280 U

(51) Int. Cl.
*F21V 7/04* (2006.01)
(52) U.S. Cl. ......... 362/623; 362/624; 362/625; 362/626
(58) Field of Classification Search ........... 362/617–626
See application file for complete search history.

(56) References Cited

U.S. PATENT DOCUMENTS

| | | | |
|---|---|---|---|
| 6,692,133 B2 | 2/2004 | Katsu et al. | |
| 7,387,422 B2* | 6/2008 | Won et al. | 362/620 |
| 7,682,063 B2* | 3/2010 | Chen et al. | 362/624 |
| 2003/0210222 A1 | 11/2003 | Ogiwara et al. | |
| 2007/0147083 A1 | 6/2007 | Hwang | |

FOREIGN PATENT DOCUMENTS

TW M289860 11/1994

* cited by examiner

*Primary Examiner* — Diane Lee
*Assistant Examiner* — Sean Gramling
(74) *Attorney, Agent, or Firm* — Bacon & Thomas, PLLC

(57) ABSTRACT

A light guide plate and a side-emitting backlight module having the same are disclosed. The light guide plate includes a transparent substrate, a plurality of prisms and a plurality of condensing lenses. The prisms are arranged side by side on one surface of the transparent substrate. The condensing lenses are disposed between two adjacent prisms, and distributed from sparsely to densely along a direction of a crest line of each of the prisms.

10 Claims, 7 Drawing Sheets

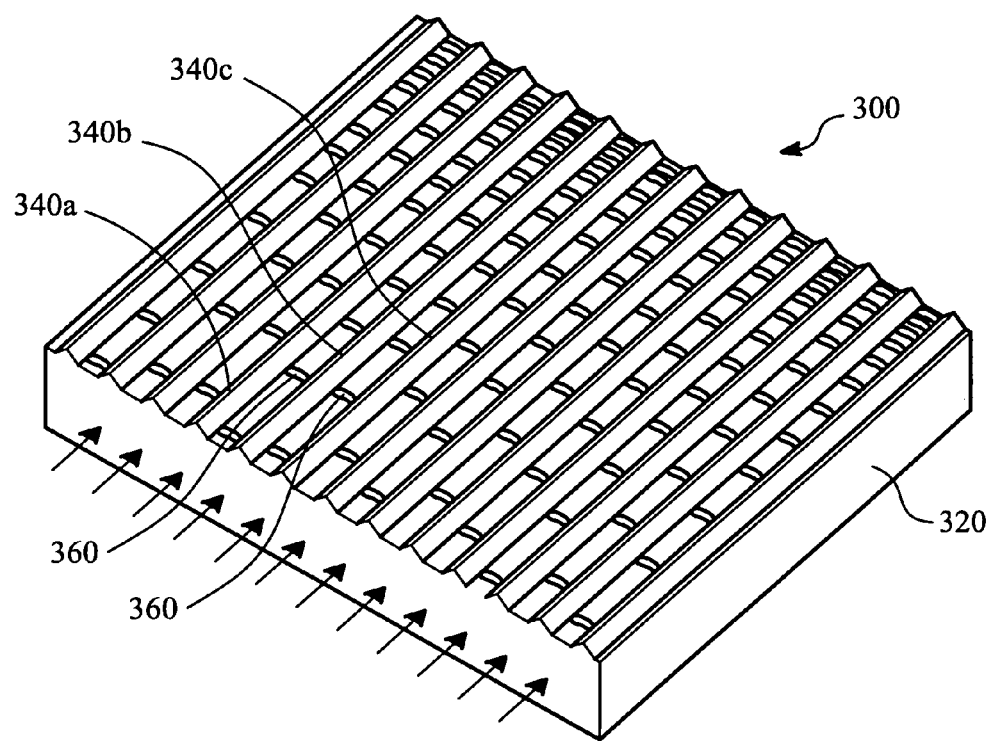
F I G. 3A
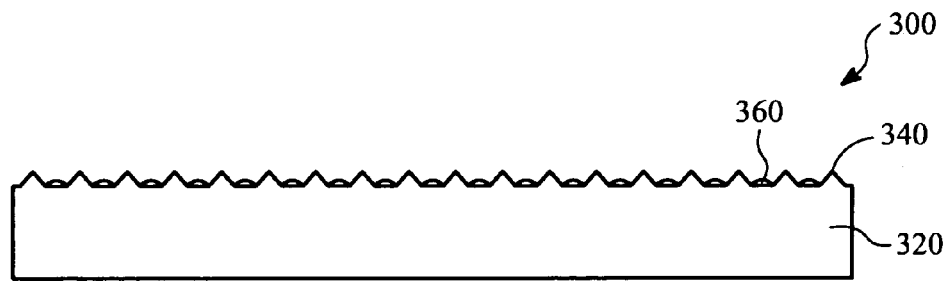
F I G. 3B

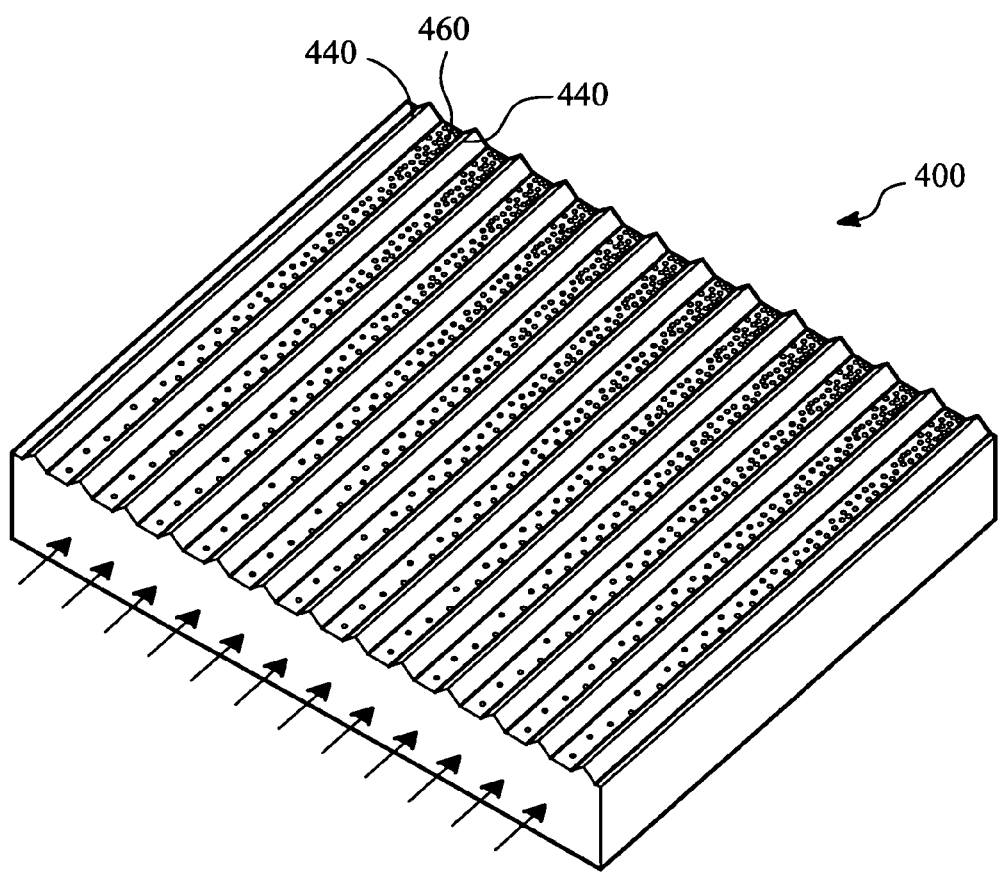
F I G. 4

LIGHT GUIDE PLATE AND SIDE-EMITTING BACKLIGHT MODULE HAVING THE SAME

BACKGROUND OF THE INVENTION (1) Field of the Invention

The present invention relates to a light guide plate and a side-emitting backlight module having the same, and more particularly relates to a light guide plate with a micro-structure and a side-emitting backlight module having the same.

(2) Description of the Prior Art

A light guide plate is an important component affecting the light efficiency of a side-emitting backlight module. The light guide plate is applied to the side-emitting backlight module to transform the light beam from a point light or a line light source to an uniform plane light and then enhance the uniformity and brightness of the plane light based on the light uniform ability of a diffusion film and light concentration ability of a brightness enhancement film. The light guide plate has two types of appearance, wedge and flat. Generally, a notebook computer adopts wedge type due to considering the space allocation, while a liquid crystal display (LCD) Monitor and a LCD TV use flat type mostly.

Refer to FIG. 1A for a schematic view of a side-emitting backlight module 100 having a conventional light guide plate 100. The side-emitting backlight module 100 includes a light guide plate 120, a light source 140, a brightness enhancement film 160 and a diffusion film 180. The light guide plate 120 is a wedge transparent board, mainly used in conducting the light direction to enhance the brightness of a liquid crystal panel and control the uniformity. The wedge light guide plate 120 generally includes a thick end-surface 122, a thin end-surface 124, a bottom surface 126 and a top surface 128. During the assembly of the side-emitting backlight module 100, the bottom surface 126 of the light guide plate 120 usually faces down and the top surface 128 faces up, while the brightness enhancement film 160 and the diffusion film 180 are disposed on the top surface 128. In FIG. 1A, the bottom surface 126 is set upwards to illustrate the micro-structure.

The bottom surface 126 of the light guide plate 120 forms a micro-structure with a plurality of prisms 126a side by side, called V-cut structure. The light source 140 is disposed at the side of the thick end-surface 122 of the light guide plate 120. Most of the light is transferred to the thin end-surface 124 by total reflection after it enters the light guide plate 120. When the light is transferred to the prisms 126a on the bottom surface 126 of the light guide plate 120, it is concentrated and then emitted out from the top surface 128 (as arrow shows). Thus the light is more uniform after passing through the light guide plate 120 based on the design of the micro-structure.

However, the bottom surface 126 of the light guide plate 120 uses prisms 126a to gather light, so when the line light source or point light source sends light to the light guide plate 120, the incident side of the light guide plate 120 appears bright and dark obviously because of the gathered light, referring to FIG. 1B and FIG. 1C. FIG. 1B displays the distribution of the bright lines 102 of the side-emitting backlight module 100 when the light source 140 is a cold cathode fluorescent lamp 140a (CCFL). FIG. 1C displays the distribution of the bright halos 104 of the side-emitting backlight module 100 when the light source 140 consists of a light emitting diode (LED) 140b. It is necessary to adjust the brightness of the backlight module uniform as the backlight module is presently used in the high brightness.

For the above issues, the conventional method is to fabricate the thick end-surface 122 into a fogging surface which makes the light inside the light guide plate 120 scattered, but it adds fabrication steps, increases cost and thus reduces yield rate indirectly as well as the light use efficiency.

SUMMARY OF THE INVENTION

The present invention is to provide a light guide plate with a micro-structure, applied in the backlight module to improve the optics distribution and light gathering, also to increase the light use efficiency and adjust the optics display.

An embodiment of the present invention provides a light guide plate which includes a transparent substrate, a plurality of prisms and a plurality of condensing lenses. The transparent substrate has a surface. The plural prisms are arranged side by side on the surface of the transparent substrate. The plural condensing lenses are disposed between the two adjacent prisms, and distributed from sparsely to densely along a direction of a crest line of each of the prisms.

According to another embodiment of the present invention, a side-emitting backlight module includes a transparent substrate, a light source, a plurality of prisms and a plurality of condensing lenses. The transparent substrate includes a bottom, a light emitting surface and a light incident surface. The light emitting surface is opposite to the bottom, and the light incident surface is connected with the bottom and the light emitting surface.

The light source is disposed at one side of the transparent substrate and faces the light incident surface. The plural prisms uplifts on the bottom and arranged side by side on the bottom. The plural condensing lenses is disposed between the two adjacent prisms, and distributed from sparsely to densely along a direction of a crest line of each of the prisms. The light beams from the light source are incident to the transparent substrate through the light incident surface and emitted out from the light emitting surface after the light beams are converged by the prisms and the condensing lenses.

Preferably, the condensing lenses and the transparent substrate are integrative. A part of the bottom of the transparent substrate between the two adjacent prisms is a flatness portion and the condensing lenses are distributed on the flatness portion. Each of the prisms has a first height and each of the condensing lenses has a second height, the second height is smaller than the first height. The prisms includes a first prism, a second prism and a third prism, and the condensing lenses located between the first and the second prisms are interlaced with the condensing lenses located between the second and the third prisms. The condensing lenses have the shape of column, truncated cone or ball, or have a spherical surface or an aspheric surface.

In an embodiment of the present invention, the direction of the crest line of each of the prisms is parallel to an incident direction of the light beams generated from the light source. The light source may be a LED.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The present invention will now be specified with reference to its preferred embodiment illustrated in the drawings, in which

FIG. 3A and FIG. 3B are schematic views showing a second embodiment of the light guide plate and its micro-structure according to the present invention;

FIG. 4 is a schematic view showing a third embodiment of the light guide plate and its micro-structure according to the present invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
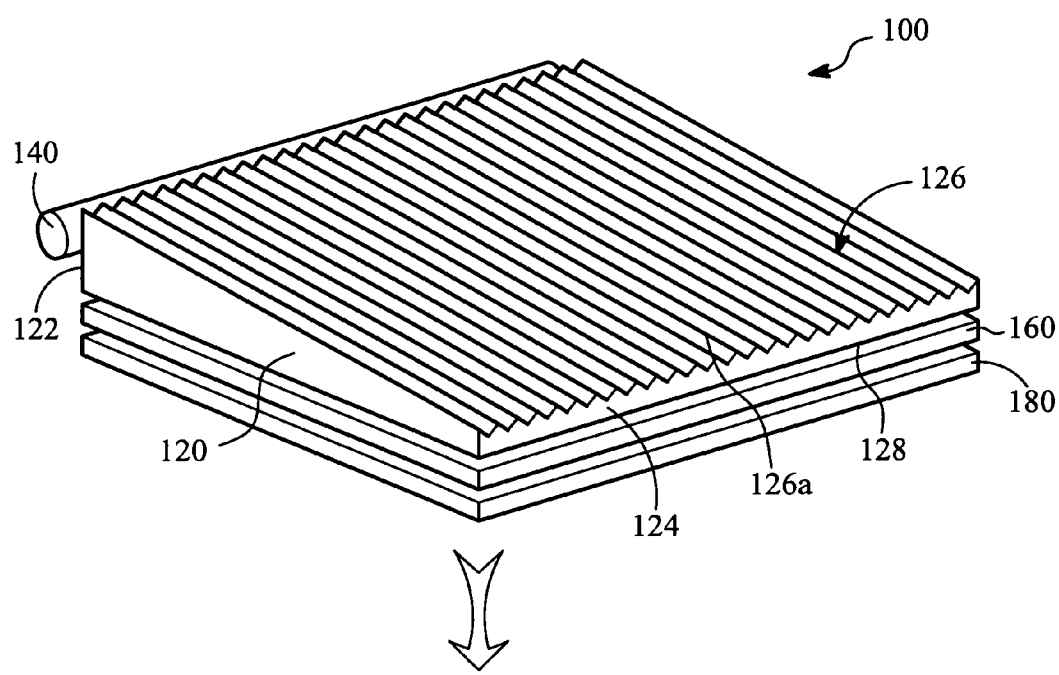
FIG. 1A is a schematic view of a side-emitting backlight module having a conventional light guide plate.
Figure 1B:
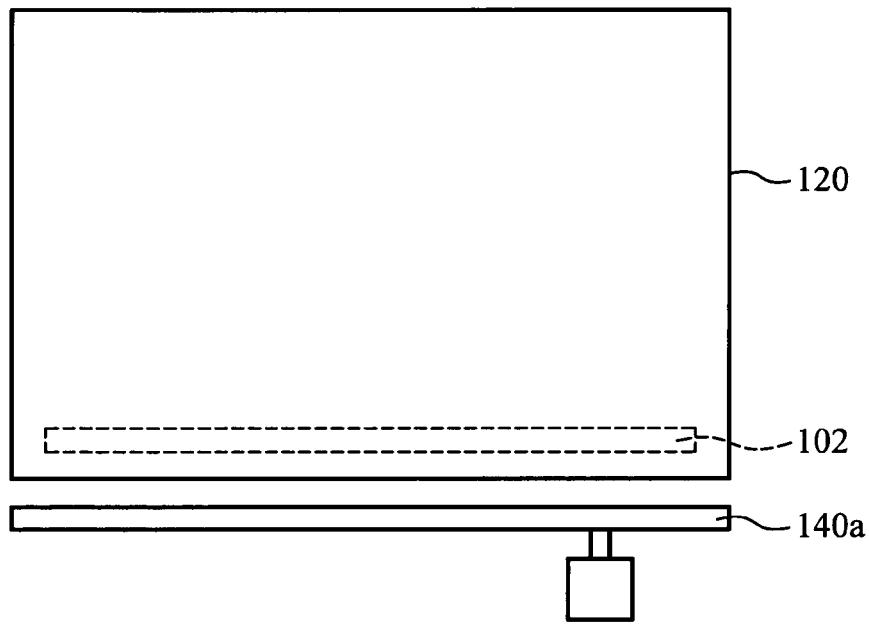
FIG. 1B is a schematic view of a bright line distribution of the conventional backlight module.
Figure 1C:
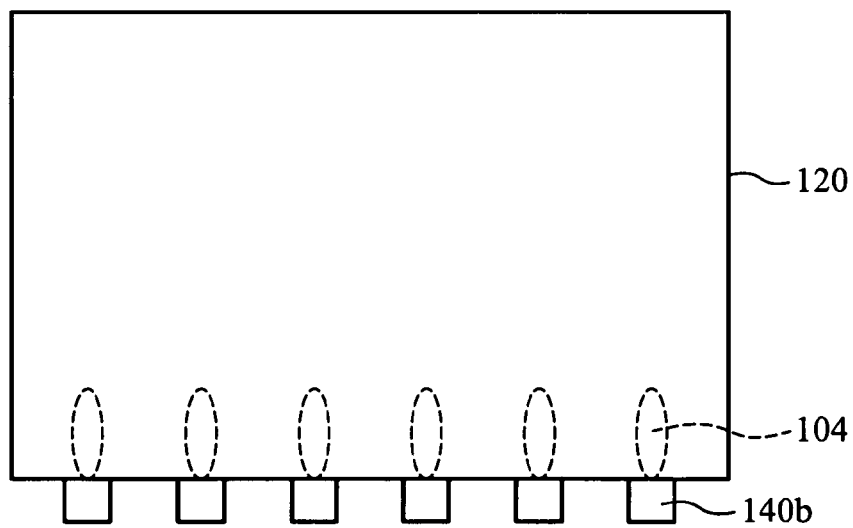
FIG. 1C is a schematic view of a bright halo distribution of the conventional backlight module.
Figure 2A:
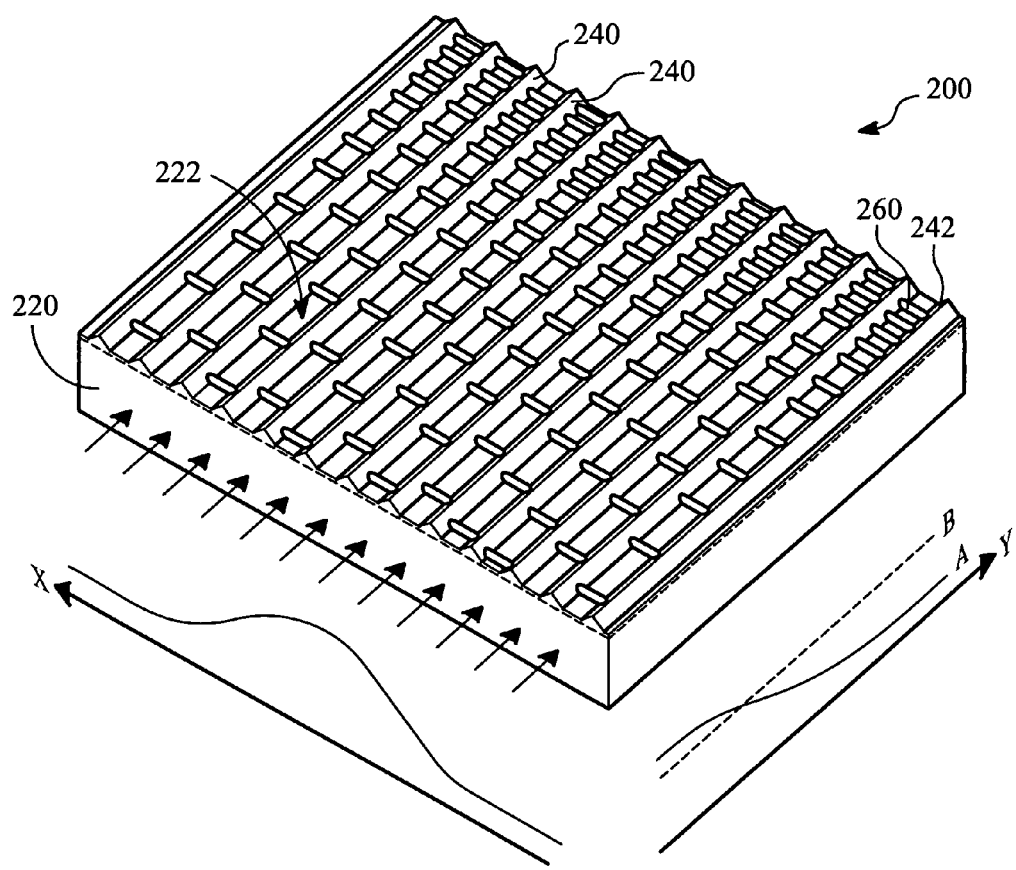
FIG. 2A and FIG. 2B are schematic views showing a first embodiment of the light guide plate and its micro-structure according to the present invention.
Figure 2B:
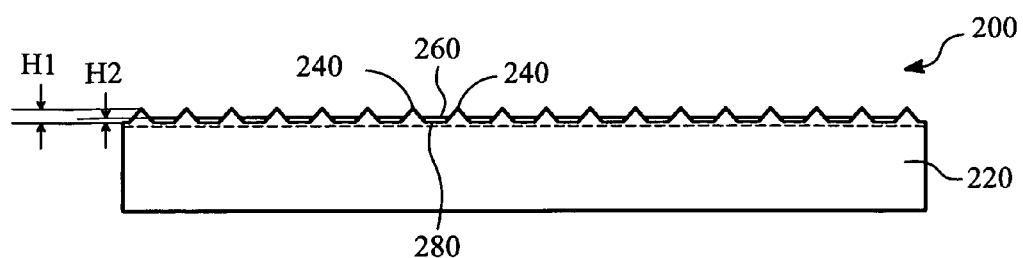

Referring to FIG. 2A and FIG. 2B, a light guide plate 200 includes a transparent substrate 220 and two kinds of microstructures which are formed on a bottom 222 of the transparent substrate 220. Two kinds of micro-structures include a plurality of prisms 240 and a plurality of condensing lenses 260. In FIG. 2A, the prisms 240 are arranged side by side on the bottom 222 of the transparent substrate 220. The condensing lenses 260 are disposed between the two adjacent prisms 240, and distributed from sparsely to densely along a direction of a crest line 242 of each of the prisms 240.

The direction of the incident light is also shown in FIG. 2A (see arrow), so in this embodiment, the direction parallel to the incident direction is defined as Y direction, while the direction vertical to the incident direction and parallel to the bottom 222 of the substrate 220 is defined as X direction. When the light guide plate 200 is applied in a side-emitting backlight module, the direction of the crest line 242 of the prism 240 is parallel to the Y direction, which makes the light beams centralized from the crest line 242 at two sides of the light guide plate 200 in the X direction. When the side-emitting backlight module is disposed on the backside of a liquid crystal panel (not shown), the brightness in the middle of the liquid crystal panel is increased in X direction. In practical use, the prism 240 is not limited to the needle shape in FIG. 2A. It may be any structure such as a flatness portion only if it is able to gather light. However, if the condensing lenses 260 is not disposed, it appears in Y direction in the brightness distribution curve A that the brightness of the side-emitting backlight module is higher near a light source and lower far from the light source.

In this embodiment, the condensing lenses 260 are disposed uplift on the bottom 222 of the transparent substrate 220 between the two adjacent prisms 240. In the end of the light guide plate 200 near the light source in Y direction, the condensing lenses 260 are arranged sparsely to decrease the light gathering effect of the light guide plate 200. In the other end of the light guide plate 200 far away from the light source in Y direction, the condensing lenses 260 are arranged densely to increase the brightness uniformity of the light guide plate 200. In this way, the brightness uniformity of backlight module in Y direction is adjusted as the brightness distribution curve B shows.

Referring to FIG. 2B for a preferable embodiment of the light guide plate 200 of the present invention. A part of the bottom 222 of the transparent substrate 220 between the two adjacent prisms 240 is a flatness portion 280. The condensing lenses 260 are distributed on the flatness portion 280. Preferably, the prisms 240, the condensing lenses 260 and the transparent substrate 220 are integrative, which makes the fabricating process easy and avoids the mould cost. The prisms 240 uplift on the bottom 222 of the transparent substrate 220. The crest line 242 on the top of the prism 240 is a first height H1 apart from the flatness portion 280. The top of the condensing lens 260 is a second height H2 apart from the flatness portion 280. The second height H2 is less than the first height H1. Thus the light guide plate 200 uses the prisms 240 cooperated with the condensing lenses 260 which are distributed gradual sparsely to densely to gather light and adjust the light distribution.

Figure 2C:
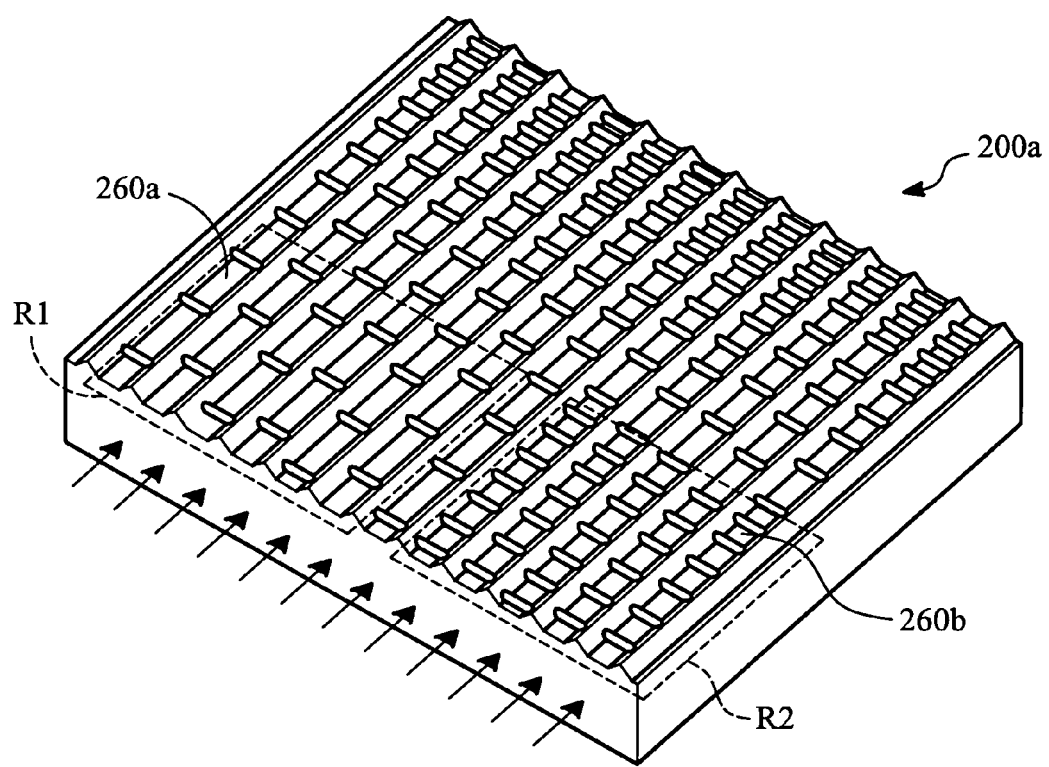
FIG. 2C is a schematic view showing another implementation way of the first embodiment according to the present invention.

Referring to the FIG. 2A, the condensing lens 260 is similar to a column with its axis in X direction, vertical to the crest line 242 of the prism 240. In practical use, the condensing lens 260 is not limited to column, but also parallel, vertical or cross to the crest line 242 of the prism 240. The density of the condensing lenses 260 on the bottom 222 of the whole transparent substrate may be partly adjusted by the measured brightness distribution. Referring to the FIG. 2C for the light guide plate 200a, the area R1 and area R2 are both at the side near the light source, but in these two areas R1 and R2, the density of the condensing lenses 260a and 260b are not the same. In FIG. 2C, the distance between the two condensing lenses 260a in the area R1 is larger than that between the two condensing lenses 260b in the area R2.

Referring to the FIGS. 3A and 3B, a light guide plate 300 has condensing lenses 360 in the truncated cone shape. The condensing lenses 360 located between the first prism 340a and the second prism 340b are interlaced with the condensing lenses 360 located between the second prism 340b and the third prism 340c, in order to make the light distribution more uniform. The first prism 340a, the second prism 340b and the third prism 340c are arranged arbitrary continuously on the light guide plate 300.

Referring to FIG. 4 for a light guide plate 400 in another embodiment of the present invention, the condensing lenses 460 are dotted between the two adjacent prisms 440. The condensing lenses 460 are distributed sparsely near the light entrance, densely far from the light entrance. Referring to FIGS. 2A, 3A and 4, the condensing lenses 260, 360, 460 may be column, truncated cone, ball or other shape. Also the condensing lenses 260, 360, 460 have a spherical surface or an aspheric surface.

Figure 5:
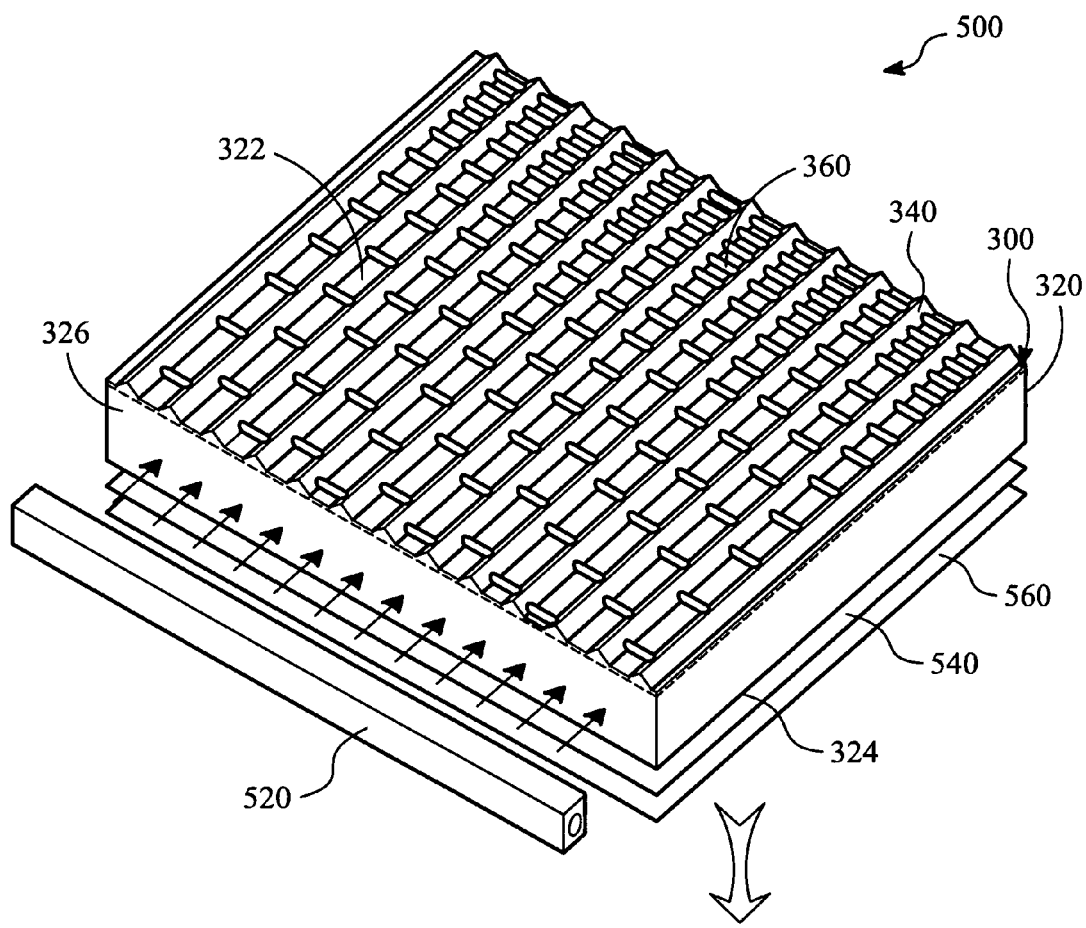
FIG. 5 is a schematic view showing an embodiment of the side-emitting backlight module according to the present invention.

Referring to FIG. 5, it is an inverted backlight module 500 illustrating the properties of an embodiment of the present invention. The backlight module 500 includes the above-mentioned light guide plate 300, a light source 520, a brightness enhancement film 540 and a diffusion film 560. The light guide plate 300 includes a transparent substrate 320, the prisms 340 and the condensing lenses 360. The transparent substrate 320 has a bottom 322, a light emitting surface 324 and an light incident surface 326. The light emitting surface 324 is opposite to the bottom 322. The light incident surface 326 is connected with the bottom 322 and the light emitting surface 324. The brightness enhancement film 540 and the diffusion film 560 are disposed at the emitting direction of the light emitting surface 324. The light source 520 is disposed at the side of the transparent substrate 320, and faces the light incident surface 326. The prisms 340 are disposed uplift on the bottom 322, and are arranged side by side on the bottom 322. The condensing lenses 360 are disposed between the two adjacent prisms 340, and distributed from sparsely to densely along the direction of the crest line of the prism 340. The light beams generated from the light source 520 are incident to the light guide plate 300 through the light incident surface 326 and emitted from the light emitting surface 324 after the light beams are converged by the prisms 340 and the condensing lenses 360.

In all the above-mentioned preferable embodiments of the side-emitting backlight module of the present invention, the direction of the crest line of the prism is parallel to the incident direction of the light beams generated from the light source. The light source includes point light or line light, such as LED or CCFL The efficiency of the light source is raised by adjusting the optics display and optical performance through the condensing lenses between two adjacent prisms.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, comprising:
   a transparent substrate comprising a bottom surface and a light emitting surface opposite to the bottom surface;
   a plurality of prisms arranged side by side on the bottom surface of the transparent substrate; and
   a plurality of condensing lenses disposed on the bottom surface between adjacent prisms of the plurality of prisms, and distributed from sparsely to densely along a direction of a crest line of each of the prisms, the condensing lenses forming respective rows between the adjacent prisms,
   wherein the condensing lenses have one of a column shape, a truncated cone shape, and a ball shape, a height of the condensing lenses is less than a height of the prisms, and adjacent rows of condensing lenses are arranged in a staggered arrangement.

2. The light guide plate of claim 1, wherein the condensing lenses and the transparent substrate are integrative.

3. The light guide plate of claim 1, wherein a part of the bottom surface of the transparent substrate between two adjacent prisms is a flatness portion and the condensing lenses are distributed on the flatness portion.

4. The light guide plate of claim 1, wherein the condensing lenses have a spherical surface or an aspheric surface.

5. A side-emitting backlight module, comprising:
   a transparent substrate, comprising a bottom surface, a light emitting surface, and a light incident surface, wherein the light emitting surface is opposite to the bottom surface, and the light incident surface is connected with the bottom surface and the light emitting surface;
   a light source disposed at one side of the transparent substrate and facing the light incident surface;
   a plurality of prisms uplifting on the bottom surface and arranged side by side on the bottom surface; and
   a plurality of condensing lenses disposed on the bottom surface between adjacent prisms of the plurality of prisms, and distributed from sparsely to densely along a direction of a crest line of each of the prisms, the condensing lenses forming respective rows between the adjacent prisms,
   wherein light beams from the light source are incident to the transparent substrate through the light incident surface and emitted out from the light emitting surface after light beams are converged by the prisms and the condensing lenses, wherein the condensing lenses have one of a column shape, a truncated cone shape, and a ball shape, a height of the condensing lenses is less than a height of the prisms, and adjacent rows of condensing lenses are arranged in a staggered arrangement.

6. The side-emitting backlight module of claim 5, wherein the direction of the crest line of each of the prisms is parallel to an incident direction of the light beams generated from the light source.

7. The side-emitting backlight module of claim 5, wherein a part of the bottom surface of the transparent substrate between two adjacent prisms is a flatness portion, and the condensing lenses are distributed on the flatness portion.

8. The side-emitting backlight module of claim 5, wherein the condensing lenses have a spherical surface or an aspheric surface.

9. The side-emitting backlight module of claim 5, wherein the condensing lenses and the transparent substrate are integrative.

10. The side-emitting backlight module of claim 5, wherein the light source has a light emitting diode.

* * * * *